(12) United States Patent
Mou et al.

(10) Patent No.: US 10,960,395 B2
(45) Date of Patent: Mar. 30, 2021

(54) PORTABLE LIQUID MEASURING AND FILTERING DEVICE

(71) Applicant: Microjet Technology Co., Ltd., Hsinchu (TW)

(72) Inventors: Hao-Jan Mou, Hsinchu (TW); Ta-Wei Hsueh, Hsinchu (TW); Shih-Chang Chen, Hsinchu (TW); Li-Pang Mo, Hsinchu (TW); Ching-Sung Lin, Hsinchu (TW); Yung-Lung Han, Hsinchu (TW); Chi-Feng Huang, Hsinchu (TW); Wei-Ming Lee, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 399 days.

(21) Appl. No.: 16/042,212

(22) Filed: Jul. 23, 2018

(65) Prior Publication Data
US 2019/0054462 A1    Feb. 21, 2019

(30) Foreign Application Priority Data

Aug. 15, 2017   (TW) ................... 106127627

(51) Int. Cl.
  *G01N 1/00* (2006.01)
  *B01L 3/00* (2006.01)
  (Continued)

(52) U.S. Cl.
  CPC ..... *B01L 3/50273* (2013.01); *B01L 3/502715* (2013.01); *C02F 1/002* (2013.01);
  (Continued)

(58) Field of Classification Search
  None
  See application file for complete search history.

(56) References Cited

U.S. PATENT DOCUMENTS

2012/0266983 A1* 10/2012 Tsai .................. E03C 1/046
                                                              137/801
2017/0057842 A1   3/2017 Dobrinsky et al.

FOREIGN PATENT DOCUMENTS

CN    103459819 A    12/2013
CN    203329123 U    12/2013
(Continued)

OTHER PUBLICATIONS

Partial European Search Report, dated Nov. 6, 2018, for European Application No. 18184910.0.

*Primary Examiner* — Jyoti Nagpaul
(74) *Attorney, Agent, or Firm* — Birch, Stewart, Kolasch & Birch, LLP

(57) ABSTRACT

A portable liquid measuring and filtering device includes a measuring channel, at least one sensor, at least one actuating device and a filtering element. The measuring channel is used for allowing a target liquid to flow therethrough. The at least one sensor is disposed within the measuring channel for measuring the target liquid. The at least one actuating device is in communication with the measuring channel for transferring the target liquid. The filtering element is disposed within the measuring channel and arranged adjacent to the at least one actuating device for filtering the target liquid. If a measuring result of the sensor indicates that a monitored value of the target liquid is abnormal, the actuating device is enabled to transfer the target liquid. Consequently, the target liquid is filtered by the filtering element.

18 Claims, 10 Drawing Sheets

(51) Int. Cl.
 C02F 1/00 (2006.01)
 C02F 9/00 (2006.01)
(52) U.S. Cl.
 CPC .......... C02F 9/005 (2013.01); *C02F 2209/08* (2013.01); *C02F 2209/29* (2013.01); *C02F 2209/36* (2013.01)

(56) References Cited

FOREIGN PATENT DOCUMENTS

| | | |
|---|---|---|
| TW | I456198 B | 10/2014 |
| TW | M544801 U | 7/2017 |
| WO | WO 2016/122706 A1 | 8/2016 |

\* cited by examiner

PORTABLE LIQUID MEASURING AND FILTERING DEVICE

FIELD OF THE INVENTION

The present invention relates to a portable liquid measuring and filtering device, and more particularly to a portable liquid measuring and filtering device having the functions of measuring and filtering a target liquid.

BACKGROUND OF THE INVENTION

With increasing development of science and technology, people pay much attention to the air pollution problem and the water pollution problem in the environment. In case that the air quality is poor, the pollutants in the ambient air may be easily isolated through the face mask at hand. However, issues of water pollution may not be easily solved by that way. In other words, it is difficult to provide clean water for drinking at any place whenever you want.

Nowadays, water filtering devices are used in many households. However, since these water filtering devices are designed for home use, they are inconvenient to carry around. In addition, the water filtering device cannot recognize the quality of the filtered water. That is, after the water is filtered, the user cannot assure whether the water is clean or not.

Therefore, there is a need of providing an improved portable liquid measuring and filtering device in order to overcome the drawbacks of the conventional technologies.

SUMMARY OF THE INVENTION

An object of the present invention provides a portable liquid measuring and filtering device. The portable liquid measuring and filtering device includes a sensor, an actuating device and a filtering element. The sensor is used for measuring the constituents of a target liquid. If the measuring result of the sensor is abnormal, the actuating device is enabled to transfer the liquid to the filtering element. Consequently, the portable liquid measuring and filtering device is capable of recognizing the quality of the liquid and filtering the liquid.

In accordance with an aspect of the present invention, there is provided a portable liquid measuring and filtering device. The portable liquid measuring and filtering device includes a measuring channel, at least one sensor, at least one actuating device and a filtering element. The measuring channel is used for allowing a target liquid to flow therethrough. The at least one sensor is disposed within the measuring channel for measuring the target liquid. The actuating device is in communication with the measuring channel for transferring the target liquid. The filtering element is disposed within the measuring channel and arranged near the actuating device for filtering the target liquid. If a measuring result of the sensor indicates that a monitored value of the target liquid is abnormal, the actuating device is enabled to transfer the target liquid to flow through the filtering element. Consequently, the target liquid is filtered by the filtering element.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
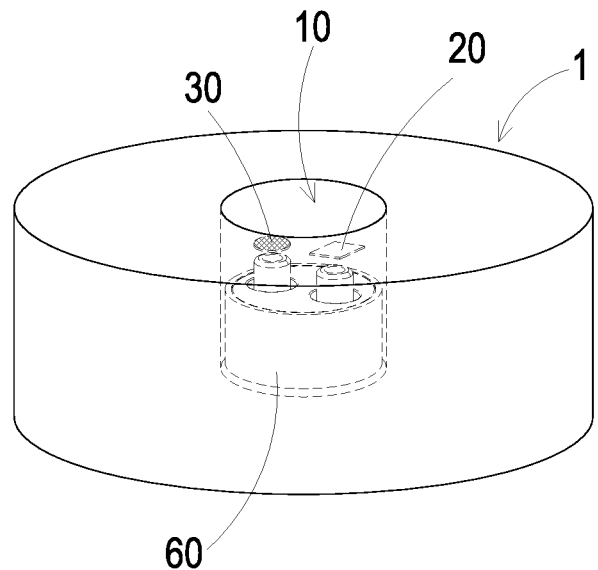
FIG. 1 is a schematic perspective view illustrating a portable liquid measuring and filtering device according to a first embodiment of the present invention.
Figure 2:
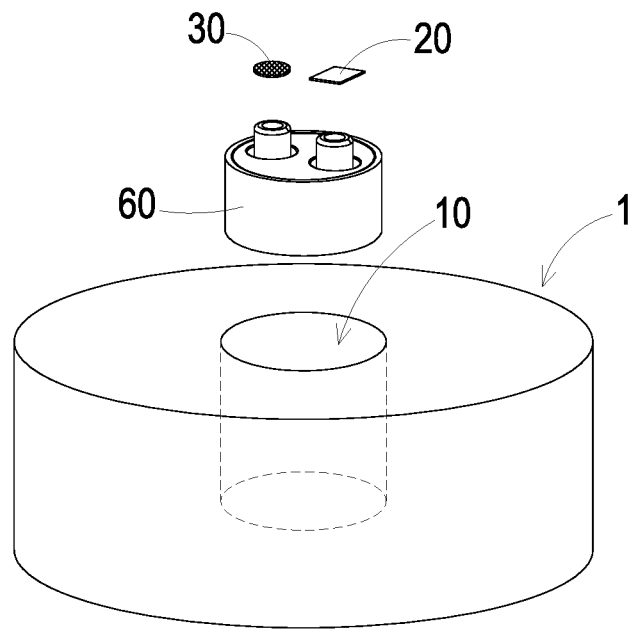
FIG. 2 is a schematic exploded view illustrating the related components of the portable liquid measuring and filtering device according to the first embodiment of the present invention.

Please refer to FIGS. 1 and 2. The present discourse provides a portable liquid measuring and filtering device including at least one measuring channel 10, at least one target liquid, at least one sensor 20, at least one actuating device 60 and at least one filtering element 30. The number of the measuring channel 10, the target liquid, and the filtering element 30 is exemplified by one for each in the following embodiments but not limited thereto. It is noted that each of the measuring channel 10, the target liquid and the filtering element 30 can also be provided in plural numbers.

Please refer to FIGS. 1 and 2. FIG. 1 is a schematic perspective view illustrating a portable liquid measuring and filtering device according to a first embodiment of the present invention. FIG. 2 is a schematic exploded view illustrating the related components of the portable liquid measuring and filtering device according to the first embodiment of the present invention. The portable liquid measuring and filtering device 1 includes a measuring channel 10, a sensor 20, an actuating device 60 and a filtering element 30. The measuring channel 10 runs through the portable liquid measuring and filtering device 1 as so to allow a target liquid to flow therein for convenience in measuring. The sensor 20 is disposed within the measuring channel 10 for measuring the target liquid. The actuating device 60 is disposed within the measuring channel 10 for transferring the target liquid. The filtering element 30 is disposed within the measuring channel 10 and arranged adjacent to the actuating device 60. The target liquid from the actuating device 60 is filtered by the filtering element 30.

Figure 3:
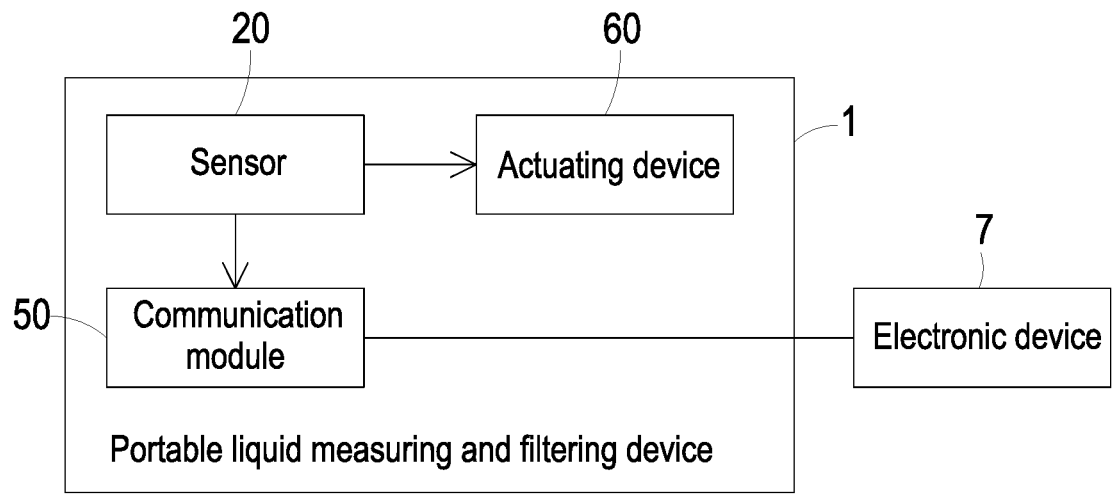
FIG. 3 is a schematic functional block diagram illustrating the relationship between the portable liquid measuring and filtering device and an electronic device.

FIG. 3 is a schematic functional block diagram illustrating the relationship between the portable liquid measuring and filtering device and an electronic device. As shown in FIG. 3, the portable liquid measuring and filtering device 1 further includes a communication module 50. The communication module 50 is electrically connected to the sensor 20. The measuring result of the sensor 20 is transmitted to the communication module 50. The portable liquid measuring and filtering device 1 is in communication with an electronic device 7 through the communication module 50. Consequently, the measuring result of the sensor 20 is transmitted to the electronic device 7 through the communication module 50. According to the measuring result of the sensor 20, the user can evaluate the quality of the target liquid.

The electronic device 7 described above is a fixed-type electronic device (e.g., a desktop computer or a display device), a portable electronic device (e.g., a notebook computer, a smart phone or a tablet computer) or a wearable device having a display capability (e.g., a smart watch, a smart bracelet or a smart glasses device), but the present disclosure is not limited thereto.

In an embodiment, the communication module 50 may be a network module. The measuring result of the target liquid is transmitted from the communication module 50 to a cloud processing device (not shown) through network connection, thereby establishing a liquid quality database. Through the liquid quality database, long-term liquid quality can be monitored by the user. For example, the quality of tap water can be monitored by the user every day.

Figure 4:
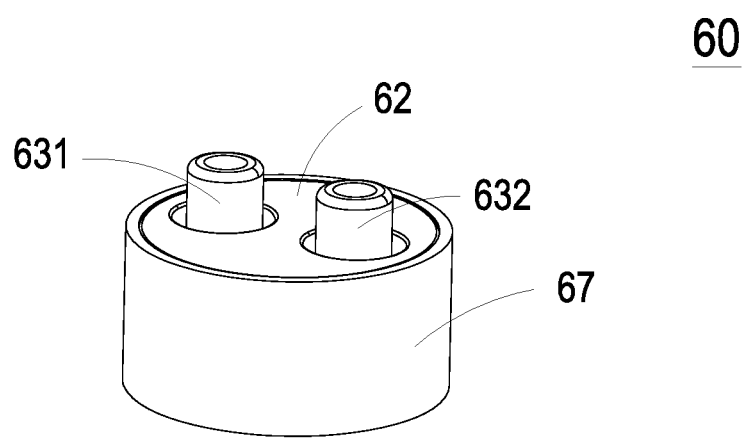
FIG. 4 is a schematic perspective view illustrating an actuating device of the portable liquid measuring and filtering device according to an embodiment of the present invention.
Figure 5A:
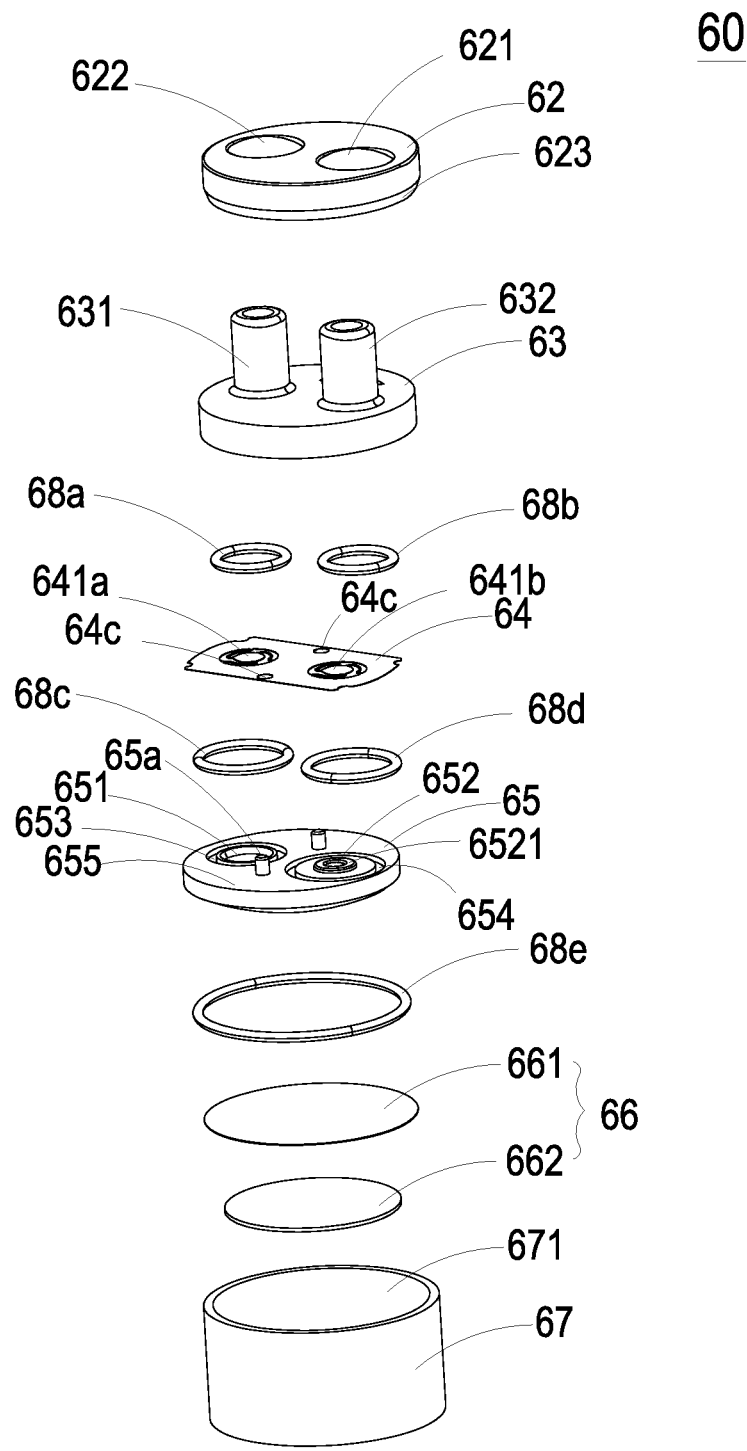
FIG. 5A is a schematic exploded view illustrating the actuating device of the portable liquid measuring and filtering device according to the first embodiment of the present invention and taken along a front side.
Figure 5B:
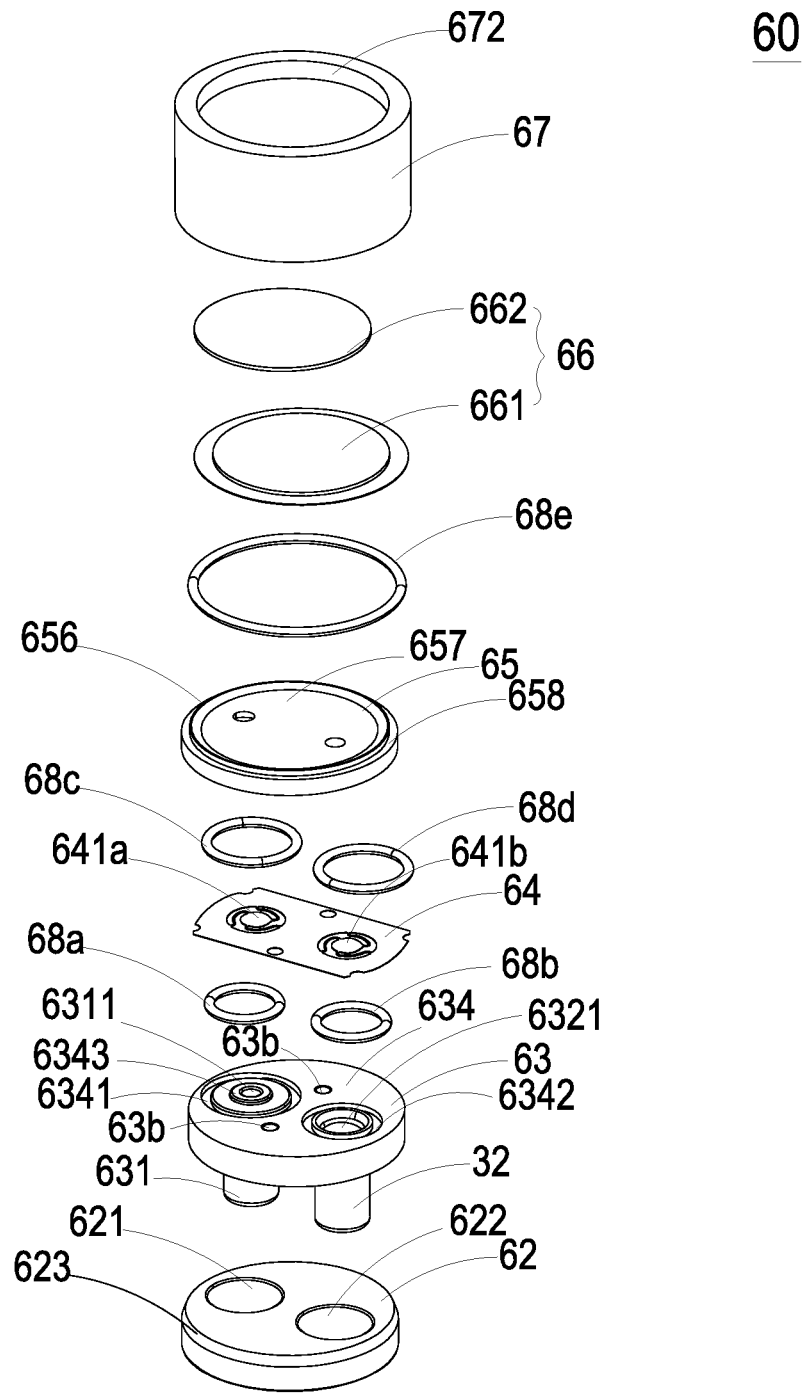
FIG. 5B is a schematic exploded view illustrating the actuating device of the portable liquid measuring and filtering device according to the first embodiment of the present invention and taken along a rear side.
Figure 6A:
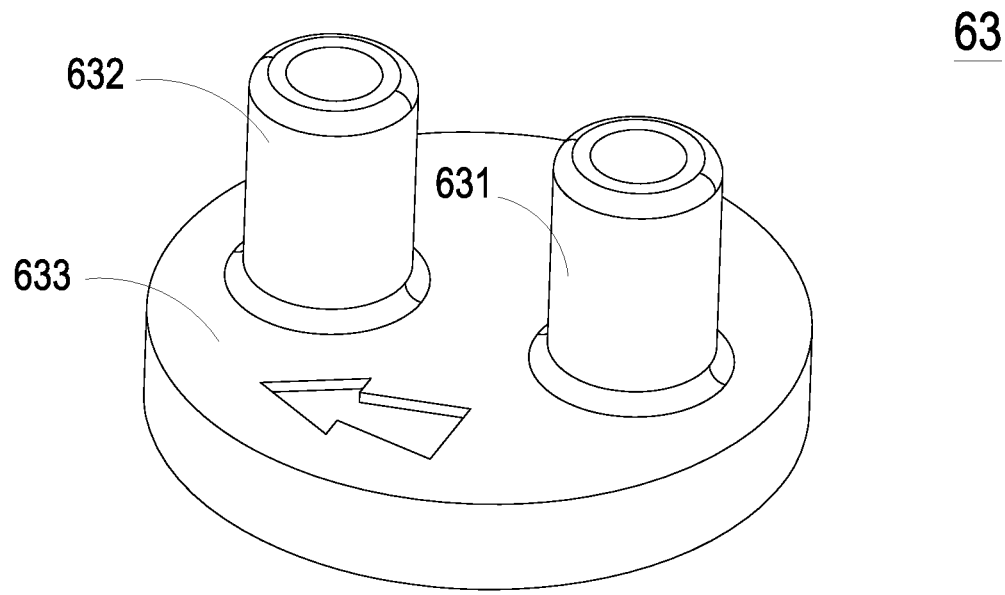
FIG. 6A is a schematic perspective view illustrating the valve body of the actuating device of the portable liquid measuring and filtering device according to the first embodiment of the present invention and taken along the front side.
Figure 6B:
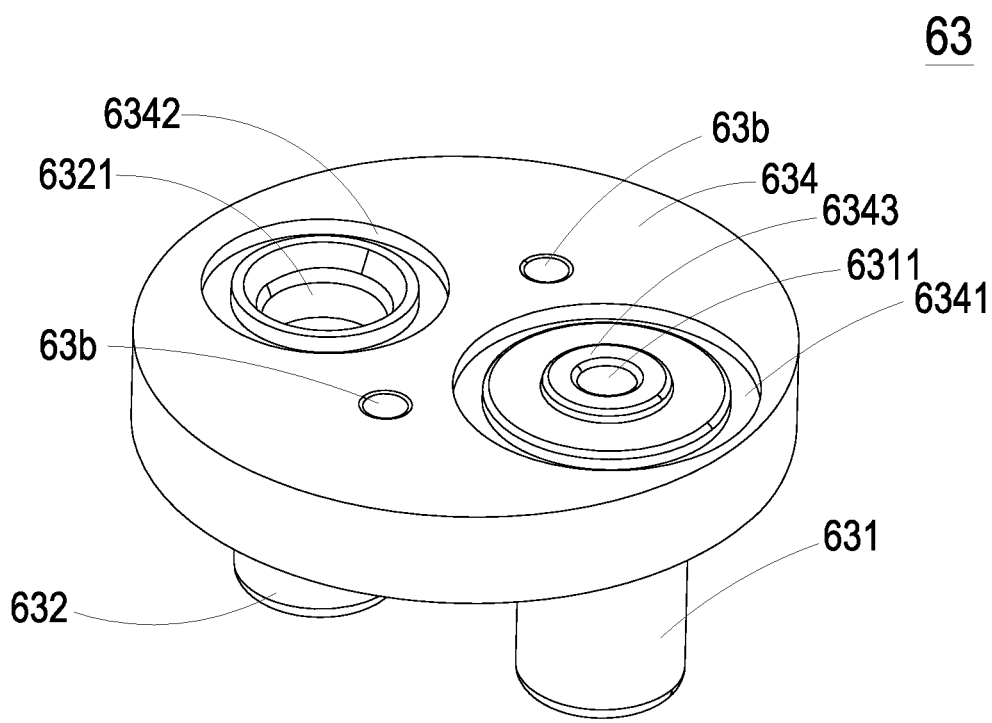
FIG. 6B is a schematic perspective view illustrating the valve body of the actuating device of the portable liquid measuring and filtering device according to the first embodiment of the present invention and taken along the rear side.
Figure 7A:
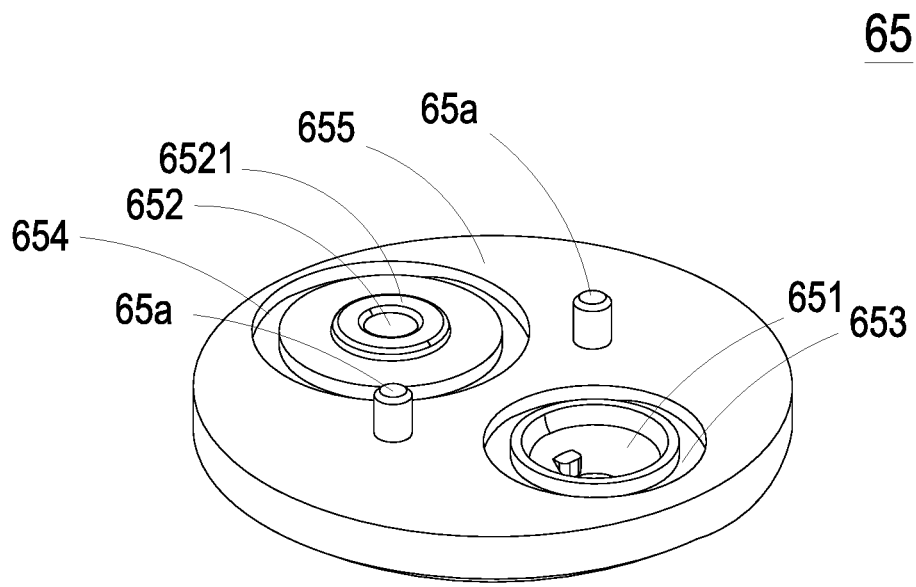
FIG. 7A is a schematic perspective view illustrating the valve chamber seat of the actuating device of the portable liquid measuring and filtering device according to the first embodiment of the present invention and taken along the front side.
Figure 7B:
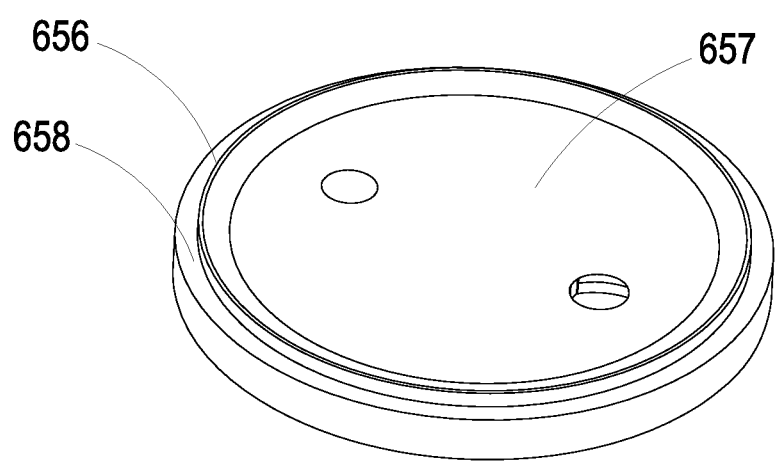
FIG. 7B is a schematic perspective view illustrating the valve chamber seat of the actuating device of the portable liquid measuring and filtering device according to the first embodiment of the present invention and taken along the rear side.

Please refer to FIGS. 4, 5A-5B, 6A-6B and 7A-7B. FIG. 4 is a schematic perspective view illustrating an actuating device of the portable liquid measuring and filtering device according to an embodiment of the present invention. FIG. 5A is a schematic exploded view illustrating the actuating device of the portable liquid measuring and filtering device according to the first embodiment of the present invention and taken along a front side. FIG. 5B is a schematic exploded view illustrating the actuating device of the portable liquid measuring and filtering device according to the first embodiment of the present invention and taken along a rear side. FIG. 6A is a schematic perspective view illustrating the valve body of the actuating device of the portable liquid measuring and filtering device according to the first embodiment of the present invention and taken along the front side. FIG. 6B is a schematic perspective view illustrating the valve body of the actuating device of the portable liquid measuring and filtering device according to the first embodiment of the present invention and taken along the rear side. FIG. 7A is a schematic perspective view illustrating the valve chamber seat of the actuating device of the portable liquid measuring and filtering device according to the first embodiment of the present invention and taken along the front side. FIG. 7B is a schematic perspective view illustrating the valve chamber seat of the actuating device of the portable liquid measuring and filtering device according to the first embodiment of the present invention and taken along the rear side. As shown in the drawings, in the embodiment, the actuating device 60 includes a valve body 63, a valve membrane 64, a valve chamber seat 65, an actuator 66 and an outer sleeve 67. After the valve body 63, the valve membrane 64, the valve chamber seat 65 and the actuator 66 are sequentially stacked on each other, the combination of the valve body 63, the valve membrane 64, the valve chamber seat 65 and the actuator 66 is accommodated within the outer sleeve 67 and assembled with the outer sleeve 67. In the embodiment, the valve body 63 of the actuating device 60 comprises an inlet tube 631 and an outlet tube 632. The inlet tube 631 and the outlet tube 632 run through a first surface 633 and a second surface 634 of the valve body 63. An inlet opening 6311 is formed on the second surface 634 and in communication with the inlet tube 631. Moreover, a groove 6341 is formed on the second surface 634 and arranged around the inlet opening 6311. A protrusion block 6343 is disposed on the periphery of the inlet opening 6311. An outlet opening 6321 is formed on the second surface 634 and in communication with the outlet tube 632. A groove 6342 is arranged around the outlet opening 6321. Moreover, plural locking recesses 63b are formed on the second surface 634 of the valve body 63.

The valve chamber seat 65 includes a third surface 655, a fourth surface 656, plural locking posts 65a, an inlet valve channel 651, an outlet valve channel 652 and a pressure chamber 657. The plural locking posts 65a are formed on the third surface 655. The locking posts 65a are aligned with the corresponding locking recesses 63b of the valve body 63. When the locking posts 65a are inserted into the corresponding locking recesses 63b of the valve body 63, the valve body 63 and the valve chamber seat 65 are combined together. The inlet valve channel 651 and the outlet valve channel 652 run through the third surface 655 and the fourth surface 656. A groove 653 is formed on the third surface 655 and arranged around the inlet valve channel 651. A protrusion block 6521 is disposed on the periphery of the outlet valve channel 652. A groove 654 is formed on the third surface 655 and arranged around the outlet valve channel 652. The pressure chamber 657 is concavely formed on the fourth surface 656. The pressure chamber 657 is in communication with the inlet valve channel 651 and the outlet valve channel 652. Moreover, a concave structure 658 is formed on the periphery of the fourth surface 656 outside the pressure chamber 657.

Figure 8:
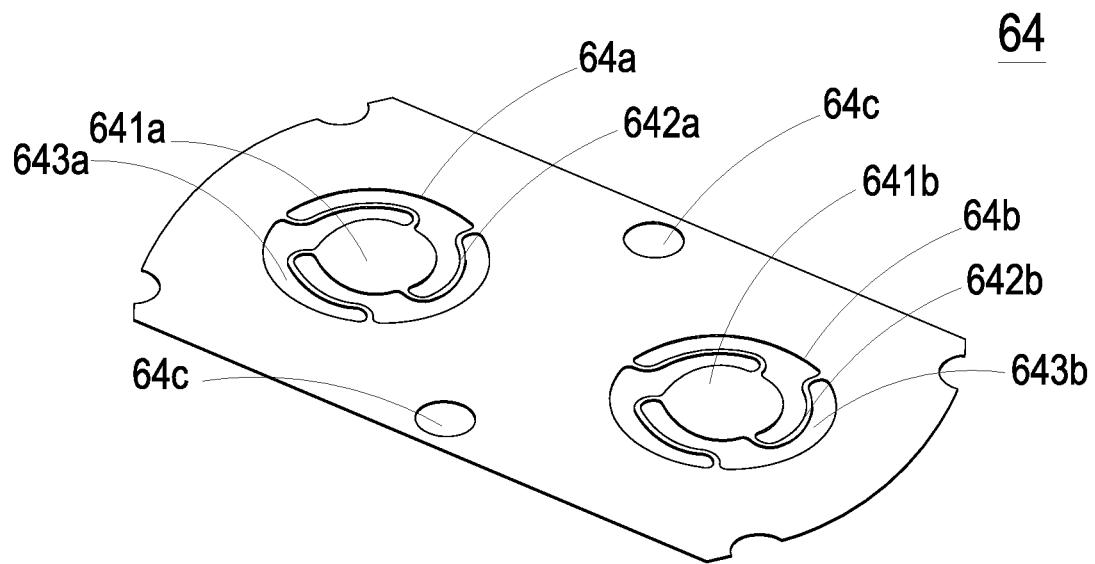
FIG. 8 is a schematic top view illustrating the valve membrane of the actuating device of the portable liquid measuring and filtering device according to the first embodiment of the present invention.

Please refer to FIGS. 5A, 5B and 8. FIG. 8 is a schematic top view illustrating the valve membrane of the actuating device of the portable liquid measuring and filtering device according to the first embodiment of the present invention. In an embodiment, the valve membrane 64 is made of polyimide (PI), and the valve membrane 64 is produced by a reactive ion etching (RIE) process. That is, a photosensitive photoresist is applied to a valve substrate, a pattern of a valve structure is formed after exposure and development of the valve substrate, and then the polyimide layer uncovered by the photoresist is etched so that the valve structure of the valve membrane 64 is formed. The valve membrane 64 is a flat thin film structure. As shown in FIG. 8, the valve membrane 64 includes two valve plates 641a and 641b at two perforated regions 64a and 64b, respectively. The two valve plates 641a and 641b have an identical thickness. The valve membrane 64 further includes plural extension parts 642a and 642b. The extension parts 642a and 642b are arranged around the valve plates 641a and 641b for elastically supporting the valve plates 641a and 641b. The valve membrane 64 further includes plural hollow parts 643a and 643b. The hollow parts 643a are arranged between the extension parts 642a. The hollow parts 643b are arranged between the extension parts 642b. When external forces are exerted on the valve plates 641a and 641b, it may induce deformation and displacement of the valve plates 641a and 641b since the valve plates 641a and 641b are elastically supported by the extension parts 642a and 642b. Therefore, the valve structure switching between open and closed states is formed, in accordance with the deformation and displacement. Preferably but not exclusively, the valve plates 641a and 641b have circular shapes, rectangular shapes, square shapes or arbitrary shapes, but not limited thereto. The valve membrane 64 further includes plural positioning holes 64c. The locking posts 65a disposed on the third surface 655 of the valve chamber seat 65 are penetrated through the corresponding positioning holes 64c. Consequently, the valve membrane 64 is positioned and supported on the valve chamber seat 65. Meanwhile, the inlet valve channel 651 and the outlet valve channel 652 are respectively covered by the valve plates 641a and 641b (shown in FIG. 11). In this embodiment, since the number of the locking posts 65a is two, the number of the positioning holes 64c is exemplified by two correspondingly, but not limited thereto. It is noted that the number of the locking posts 65a can be varied according to the number of the positioning holes 64c.

Figure 11:
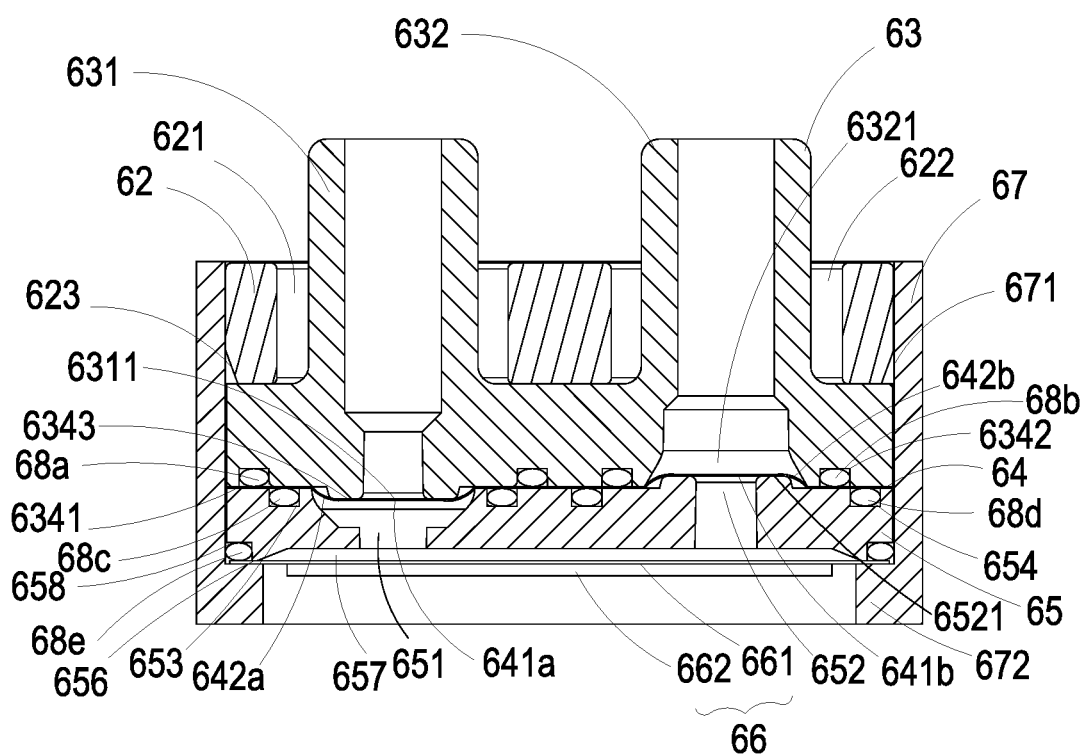
FIG. 11 is a schematic cross-sectional view illustrating the assembled structure of the actuating device of the portable liquid measuring and filtering device according to the first embodiment of the present invention.

Please refer to FIG. 11. FIG. 11 is a schematic cross-sectional view illustrating the assembled structure of the actuating device of the portable liquid measuring and filtering device according to the first embodiment of the present invention. When the valve body 63 and the valve chamber seat 65 are combined together, the sealing rings 68a and 68b, are received in the groove 6341 and the groove 6342 of the valve body 63, respectively, and the sealing rings 68c and 68d are received in the groove 653 and the groove 654 of the valve chamber seat 65, respectively. With the arrangement of the sealing rings 68a, 68b, 68c and 68d, it prevents the liquid from leaking out. Thus, the inlet tube 631 of the valve body 63 is aligned with the inlet valve channel 651 of the valve chamber seat 65 and the communication between the inlet tube 631 and the inlet valve channel 651 is selectively enabled or disabled through the valve plate 641a of the valve membrane 64. The outlet tube 632 of the valve body 63 is aligned with the outlet valve channel 652 of the valve chamber seat 65 and the communication between the outlet tube 632 and the outlet valve channel 652 is selectively enabled or disabled through the valve plate 641b of the valve membrane 64. When the valve plate 641a of the valve membrane 64 is opened, the liquid fed through the inlet tube 631 is transferred to the pressure chamber 657 through the inlet valve channel 651. When the valve plate 641b of the valve membrane 64 is opened, the liquid transferred to the pressure chamber 657 is transferred to the outlet tube 632 through the outlet valve channel 652 and exhausted.

Please refer to FIGS. 5A and 5B again. The actuator 66 includes a vibration plate 661 and a piezoelectric plate 662. The piezoelectric plate 662 is attached on the surface of the vibration plate 661. In an embodiment, the vibration plate 661 is made of a metallic material, and the piezoelectric plate 662 is made of a highly-piezoelectric material such as lead zirconate titanate (PZT) piezoelectric powder. When a voltage is applied to the piezoelectric plate 662, the piezoelectric plate 662 is subjected to a deformation. Consequently, the vibration plate 661 vibrates along the vertical direction in the reciprocating manner in response to the deformation to drive the operation of the actuating device. In this embodiment, the vibration plate 661 of the actuator 66 is assembled with the fourth surface 656 of the valve chamber seat 65 to cover the pressure chamber 657. As mentioned above, the concave structure 658 is formed on the periphery of the fourth surface 656 outside the pressure chamber 657. In addition, a sealing ring 68e is received within the concave structure 658 disposed around the pressure chamber 657 on the fourth surface 656, so as to prevent the pressure chamber 657 from the liquid leakage.

As mentioned above, the valve body 63, the valve membrane 64, the valve chamber seat 65 and the actuator 66 are the main components of the actuating device 60 for the liquid transportation. In accordance with the feature of the present invention, the actuating device 60 has a specified mechanism for assembling and positioning these components. That is, it is not necessary to use the fastening elements (e.g., screws, nuts or bolts) to fasten these components. In an embodiment, by utilizing the design of the valve cap 62 and an outer sleeve, the valve body 63, the valve membrane 64, the valve chamber seat 65 and the actuator 66 are sequentially stacked on each other and accommodated within the outer sleeve 67. Then, the valve cap 62 is tight-fitted into the outer sleeve 67. Consequently, the actuating device 60 is assembled. The mechanism for assembling and positioning these components will be described as follows.

Figure 9:
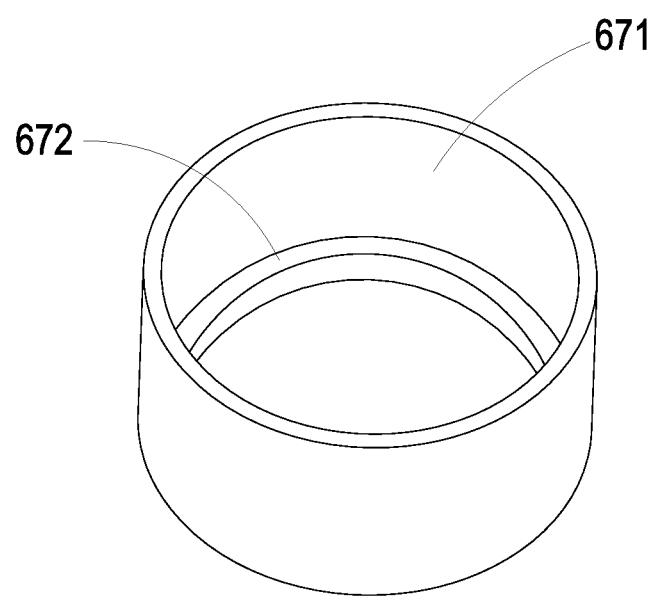
FIG. 9 is a schematic perspective view illustrating the outer sleeve of the actuating device of the portable liquid measuring and filtering device according to the first embodiment of the present invention.
Figure 10A:
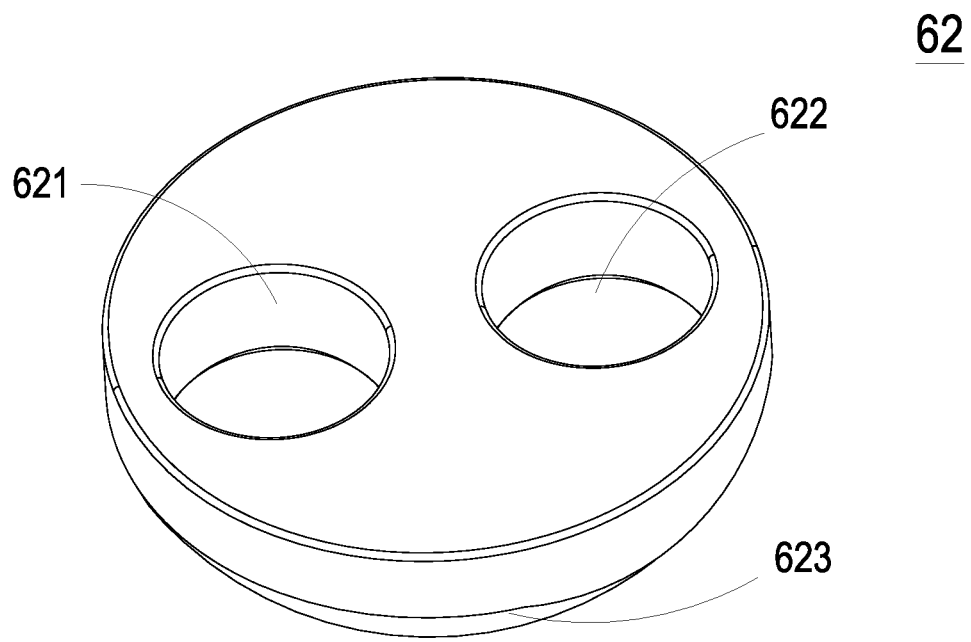
FIG. 10A is a schematic perspective view illustrating the valve cap of the actuating device of the portable liquid measuring and filtering device and taken along the front side.
Figure 10B:
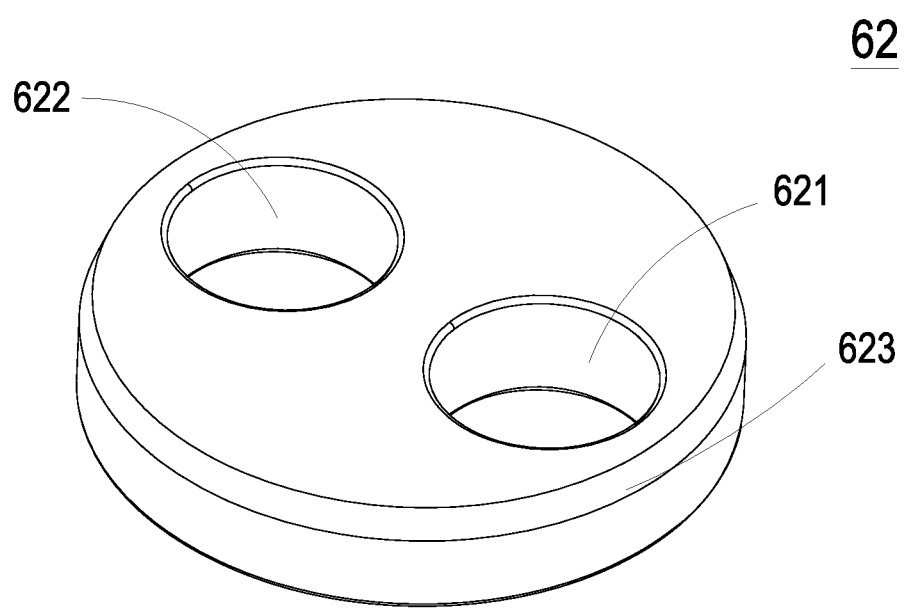
FIG. 10B is a schematic perspective view illustrating the valve cap of the actuating device of the portable liquid measuring and filtering device and taken along the rear side.

Please refer to FIGS. 5A, 5B and 9. FIG. 9 is a schematic perspective view illustrating the outer sleeve of the actuating device of the portable liquid measuring and filtering device according to the first embodiment of the present invention. The outer sleeve 67 is made of a metallic material. An accommodation space is defined by an inner wall 671 of the outer sleeve 67. Moreover, a ring-shaped protrusion structure 672 is formed on the lower portion of the inner wall 671 of the outer sleeve 67. Please refer to FIGS. 10A and 10B. FIG. 10A is a schematic perspective view illustrating the valve cap of the actuating device of the portable liquid measuring and filtering device and taken along the front side. FIG. 10B is a schematic perspective view illustrating the valve cap of the actuating device of the portable liquid measuring and filtering device and taken along the rear side. The valve cap 62 is also made of a metallic material. The valve cap 62 includes a first opening 621 and a second opening 622. The inlet tube 631 and the outlet tube 632 of the valve body 63 are penetrated through the first opening 621 and the second opening 622, respectively. Moreover, a bottom edge of the valve cap 62 has a chamfer structure 623. The outer diameter of the valve cap 62 is slightly larger than the inner diameter of the outer sleeve 67.

Please refer to FIGS. 5A and 5B again. After the valve body 63, the valve membrane 64, the valve chamber seat 65 and the actuator 66 are sequentially stacked on each other, the combination of the valve body 63, the valve membrane 64, the valve chamber seat 65 and the actuator 66 is placed into the accommodation space surrounded with the inner wall 671 of the outer sleeve 67. The outer diameter of the valve cap 62 is designed to be slightly larger than the inner diameter of the inner wall 671 of the outer sleeve 67. Because of the design of the chamfer structure 623, the valve cap 62 is tight-fitted into the outer sleeve 67. Consequently, the combination of the valve body 63, the valve membrane 64, the valve chamber seat 65 and the actuator 66 is securely fixed between the valve cap 62 and the outer sleeve 67. Therefore, the actuating device 60 is assembled. In this embodiment, the actuator 66 is also disposed within the accommodation space surrounded with the inner wall 671 of the outer sleeve 67. When piezoelectric plate 662 is subjected to a deformation in response to the applied voltage, the vibration plate 661 vibrates along the vertical direction in the reciprocating manner. In other words, it is not necessary to use the fastening elements (e.g., screws, nuts or bolts) to fasten the components of the actuating device 60.

Please refer to FIG. 11 again. The inlet valve channel 651 of the valve chamber seat 65 is aligned with the inlet opening 6311 of the valve body 63. The inlet valve channel 651 of the valve chamber seat 65 and the inlet opening 6311 of the valve body 63 are selectively in communication with each other through the valve plate 641a of the valve membrane 64. When the inlet opening 6311 of the valve body 63 is closed by the valve plate 641a, the valve plate 641a is in close contact with the protrusion block 6343 of the valve body 63. Consequently, a pre-force is generated to result in a stronger sealing effect, thereby preventing the liquid from flowing back. The outlet valve channel 652 of the valve chamber seat 65 is aligned with the outlet opening 6321 of the valve body 63. The outlet valve channel 652 of the valve chamber seat 65 and the outlet opening 6321 of the valve body 63 are selectively in communication with each other through the valve plate 641b of the valve membrane 64. When the outlet valve channel 652 of the valve chamber seat 65 is closed by the valve plate 641b, the valve plate 641b is in close contact with the protrusion block 6521 of the valve chamber seat 65. Consequently, a pre-force is generated to result in a stronger sealing effect, thereby preventing the liquid from flowing back to the pressure chamber 657. In case that the actuating device 60 is disabled, the liquid existing in the pressure chamber 657 does not flow back to the inlet tube 631 and the outlet tube 632 of the valve body 63.

Figure 12A:
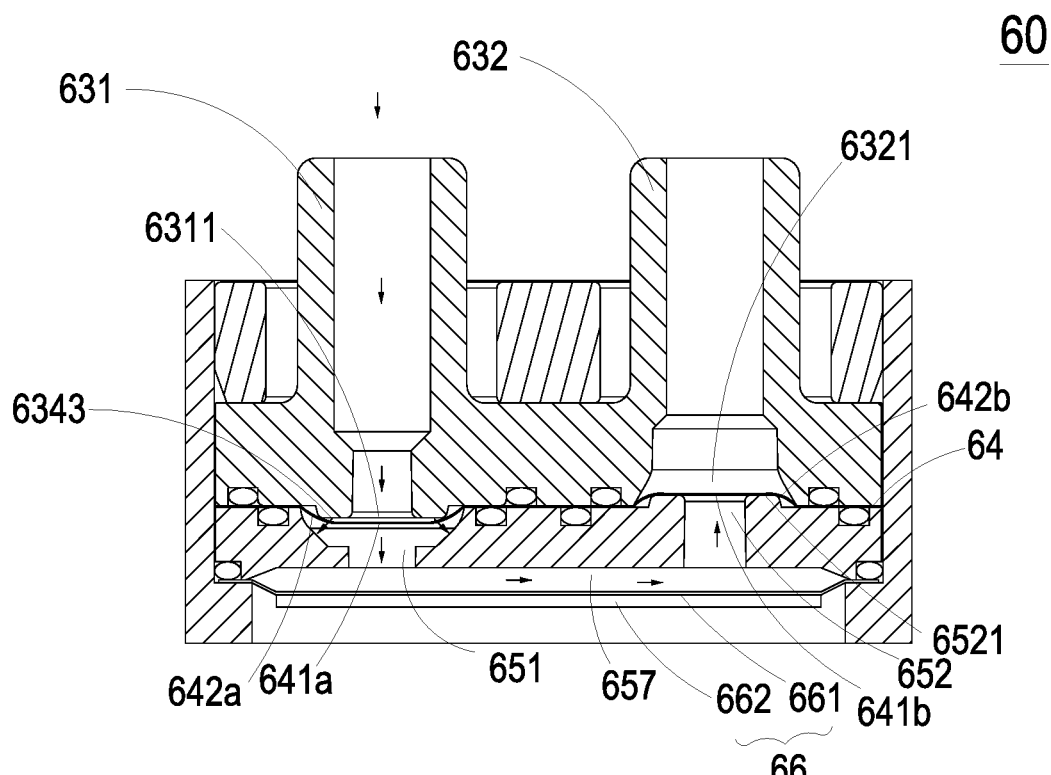
FIG. 12A is a schematic perspective view illustrating the operations of the actuating device of the portable liquid measuring and filtering device in a first situation.

The operations of the actuating device 60 will be described in more details as follows. FIG. 12A is a schematic perspective view illustrating the operations of the actuating device of the portable liquid measuring and filtering device in a first situation. When the piezoelectric plate 662 of the actuator 66 is subjected to a deformation in response to the applied voltage and causes downwardly deformation of the vibration plate 661, the volume of the pressure chamber 657 is expanded to result in suction. In response to the suction, the valve plate 641a of the valve membrane 64 is quickly opened. Consequently, a great amount of the liquid is inhaled into the inlet tube 631 of the valve body 63, and transferred to and temporarily stored in the pressure chamber 657 through the inlet opening 6311 of the valve body 63, the hollow parts 643a of the valve membrane 64 and the inlet valve channel 651 of the valve chamber seat 65. While the suction is also exerted on the outlet valve channel 652, the valve plate 641b supported by the extension parts 642b of the valve membrane 64 is in close contact with the protrusion block 6521 of the valve chamber seat 65 and the valve plate 641b is operated in a closed state.

Figure 12B:
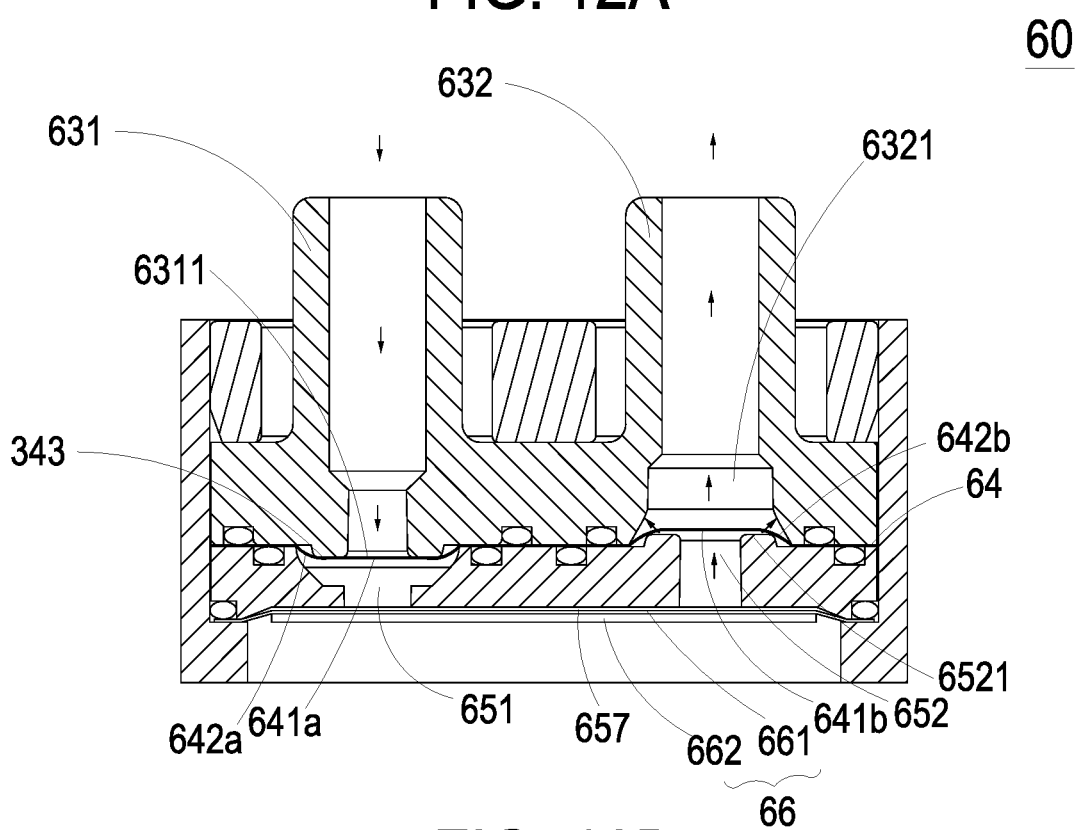
FIG. 12B is a schematic perspective view illustrating the operations of the actuating device of the portable liquid measuring and filtering device in a second situation.

FIG. 12B is a schematic perspective view illustrating the operations of the actuating device of the portable liquid measuring and filtering device in a second situation. Then, the direction of electric field piezoelectric plate 662 is changed. Since the vibration plate 661 is upwardly deformed, the volume of the pressure chamber 657 is shrunken. Meanwhile, the liquid within the pressure chamber 657 is compressed, and a pushing force is applied to the inlet valve channel 651. In response to the pushing force, the valve plate 641a is supported by the extension parts 642a of the valve membrane 64. Under this circumstance, the valve plate 641a is in close contact with the protrusion block 6343 of the valve body 63. Consequently, the valve plate 641a is operated in a closed state, and the liquid does not flow back to the inlet valve channel 651. Meanwhile, the pushing force is also applied to the outlet valve channel 652. In response to the pushing force, the valve plate 641b is supported by the extension parts 642b of the valve membrane 64 and the valve plate 641b is separated from the protrusion block 6521. Meanwhile, the valve plate 641b is operated in an opened state, and the liquid is transferred from the pressure chamber 657 to the external portion of the actuating device 60 through the outlet valve channel 652 of the valve chamber seat 65, the hollow parts 643b of the valve membrane 64, the outlet opening 6321 of the valve body 63 and the outlet tube 632 of the valve body 63. The processes of FIGS. 12A and 12B are repeatedly done. Consequently, the liquid can be transferred by the actuating device 60 at high efficiency without being returned back.

As to the portable liquid measuring and filtering device 1 in the above embodiments, the sensor 20 can be utilized to detect the target liquid therearound. If a measuring result of the sensor 20 indicates that a monitored value of the target liquid is abnormal, the actuating device 60 is enabled to transfer the target liquid to flow into the filtering element 30. Consequently, the target liquid is filtered by the filtering element.

The sensor 20 described above is used for measuring at least one selected from the group consisting of bacteria, viruses, heavy metals, chlorine and combinations thereof. The filtering element 30 is primarily matched to the information detected by the sensor 20. In the embodiment, the filtering element 30 is at least one selected from the group consisting of a polypropylene cotton filter, an activated carbon filter, a semipermeable membrane (e.g., a reverse osmosis membrane) and combinations thereof.

In addition, the sensor 20 is also used for detecting a biomarker and thus generates a value corresponding thereto. Preferably but not exclusively, the sensor 20 is a graphene sensor.

From the above descriptions, the present invention provides the portable liquid measuring and filtering device. The sensor is used for measuring the constituents of the target liquid. If the measuring result of the sensor is abnormal, the actuating device is enabled by the sensor. Consequently, the actuating device transfers the target liquid. Then, the target liquid is sent to the filtering element and filtered by the filtering element. The measuring step and the filtering step are repeatedly done until the measuring result of the target liquid is normal. Consequently, by implementing the present disclosure, the user can acquire the clean water source everywhere and at any time. In case that the portable liquid measuring and filtering device is connected to the electronic device, the user is informed of the constituents of the target liquid through the electronic device. In other words, the portable liquid measuring and filtering device is industrially valuable.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable liquid measuring and filtering device, comprising:
    a measuring channel for allowing a target liquid to flow therethrough;
    at least one sensor disposed within the measuring channel for measuring the target liquid;
    at least one actuating device in communication with the measuring channel for transferring the target liquid, and comprising a valve cap, a valve body, a valve membrane, a valve chamber seat, an actuator and an outer sleeve, wherein the valve cap has a first opening and a second opening, the valve body has an inlet tube, an outlet tube, the outer sleeve has an accommodation space surrounded with an inner wall of the outer sleeve, a ring-shaped protrusion structure is formed on the inner wall of the outer sleeve, and the valve body, the valve membrane, the valve chamber seat and the actuator are sequentially stacked on each other, accommodated within the accommodation space of the outer sleeve, and supported on the ring-shaped protrusion structure, wherein the inlet tube and the outlet tube of the valve body are respectively penetrated through the first opening and the second opening of the valve cap, while the actuator is enabled, the target liquid is fed into the inlet tube and outputted from the outlet tube; and
    a filtering element disposed within the measuring channel and arranged adjacent to the actuating device for filtering the target liquid,
    wherein if a measuring result of the sensor indicates that a monitored value of the target liquid is abnormal, the actuating device is enabled to transfer the target liquid to flow through the filtering element, so that the target liquid is filtered by the filtering element.

2. The portable liquid measuring and filtering device according to claim 1, wherein the sensor detects at least one selected from the group consisting of bacteria, viruses, heavy metals, chlorine and combinations thereof.

3. The portable liquid measuring and filtering device according to claim 1, wherein the filtering element is at least one selected from the group consisting of a polypropylene cotton filter, an activated carbon filter, a semipermeable membrane and combinations thereof, wherein the semipermeable membrane comprises a reverse osmosis membrane.

4. The portable liquid measuring and filtering device according to claim 1, wherein the portable liquid measuring and filtering device further comprises a communication module, and the communication module is electrically connected to the at least one sensor, whereby the measuring result is transmitted by the at least one sensor through the communication module.

5. The portable liquid measuring and filtering device according to claim 4, wherein the measuring result is transmitted from the at least one sensor to an electronic device through the communication module.

6. The portable liquid measuring and filtering device according to claim 5, wherein the electronic device is a portable electronic device.

7. The portable liquid measuring and filtering device according to claim 5, wherein the electronic device is a fixed-type electronic device.

8. The portable liquid measuring and filtering device according to claim 5, wherein the electronic device is a wearable device.

9. The portable liquid measuring and filtering device according to claim 4, further comprising a cloud processing device, wherein information about constituents of the target liquid from the measuring result is transmitted from the communication module to the cloud processing device for establishing a liquid quality database.

10. The portable liquid measuring and filtering device according to claim 1,
    the valve body further has a first surface and a second surface, wherein the inlet tube and the outlet tube of the valve body run through the first surface and the second surface, an inlet opening is formed in the second surface and in communication with the inlet tube, and an outlet opening is formed in the second surface and in communication with the outlet tube;
    the valve membrane has two valve plates, plural extension parts and plural hollow parts, wherein the two valve plates have an identical thickness, the plural extension parts are arranged around the valve plates for elastically supporting the valve plates, and the hollow parts are arranged between the extension parts;
    the valve chamber seat has a third surface, a fourth surface, an inlet valve channel and an outlet valve channel, wherein the inlet valve channel and the outlet valve channel run through the third surface and the fourth surface, the two valve plates are supported on the inlet valve channel and the outlet valve channel, respectively, a pressure chamber is concavely formed on the fourth surface, and the pressure chamber is in communication with the inlet valve channel and the outlet valve channel;
    wherein the pressure chamber of the valve chamber seat is covered by the actuator.

11. The portable liquid measuring and filtering device according to claim 10, wherein plural locking recesses are formed on the second surface of the valve body of the actuating device, and plural locking posts are formed on the third surface of the valve chamber seat, wherein the plural locking posts are inserted into the locking recesses correspondingly, so as to position the valve chamber seat on the valve body.

12. The portable liquid measuring and filtering device according to claim 11, wherein the valve membrane of the actuating device is arranged between the valve body and the valve chamber seat, and the valve membrane comprises plural positioning holes corresponding to the plural locking posts of the valve chamber seat, wherein the plural locking posts are penetrated through the corresponding positioning holes, so as to position the valve membrane.

13. The portable liquid measuring and filtering device according to claim 12, wherein the valve body of the actuating device has a plurality of grooves disposed on the second surface and arranged around the inlet opening and the outlet opening, respectively, and the valve chamber seat has a plurality of grooves disposed on the third surface and arranged around the inlet valve channel and the outlet valve channel, respectively, wherein each of the grooves of the valve body and the valve chamber seat receives a sealing ring, so as to prevent the target liquid from leaking out.

14. The portable liquid measuring and filtering device according to claim 13, wherein the valve body of the actuating device has a first protrusion block disposed on the second surface and arranged around the inlet opening, and the valve chamber seat has a second protrusion block disposed on the third surface and arranged around the outlet valve channel, wherein the first protrusion block and the second protrusion block are in close contact with the two valve plates of the valve membrane to generate a pre-force to result in a stronger sealing effect and prevent the target liquid from backflow.

15. The portable liquid measuring and filtering device according to claim 14, wherein the actuator of the actuating device comprises a vibration plate and a piezoelectric plate, the piezoelectric plate is attached on a surface of the vibration plate, the piezoelectric plate is subjected to a deformation in response to an applied voltage, and the vibration plate of the actuator is assembled with the fourth surface of the valve chamber seat to cover the pressure chamber.

16. The portable liquid measuring and filtering device according to claim 1, wherein the sensor detects a biomarker and generates a value corresponding thereto.

17. The portable liquid measuring and filtering device according to claim 1, wherein the sensor is a graphene sensor.

18. A portable liquid measuring and filtering device, comprising:
at least one measuring channel for allowing at least one target liquid to flow therethrough;
at least one sensor disposed within the measuring channel for measuring the target liquid;
at least one actuating device in communication with the measuring channel for transferring the target liquid, and comprising at least one valve cap, at least one valve body, at least one valve membrane, at least one valve chamber seat, at least one actuator and at least one outer sleeve, wherein the at least one valve cap has at least one first opening and at least one second opening, the at least one valve body has at least one inlet tube, at least one outlet tube, the at least one outer sleeve has at least one accommodation space surrounded with at least one inner wall of the at least one outer sleeve, at least one ring-shaped protrusion structure is formed on the at least one inner wall of the at least one outer sleeve, and the at least one valve body, the at least one valve membrane, the at least one valve chamber seat and the at least one actuator are sequentially stacked on each other, accommodated within the at least one accommodation space of the at least one outer sleeve, and supported on the at least one ring-shaped protrusion structure, wherein the at least one inlet tube and the at least one outlet tube of the at least one valve body are respectively penetrated through the at least one first opening and the at least one second opening of the at least one valve cap, while the at least one actuator is enabled, the target liquid is fed into the at least one inlet tube and outputted from the at least one outlet tube; and
at least one filtering element disposed within the measuring channel and arranged adjacent to the actuating device for filtering the target liquid,
wherein if a measuring result of the sensor indicates that a monitored value of the target liquid is abnormal, the at least one actuating device is enabled to transfer the target liquid to flow through the at least one filtering element, so that the target liquid is filtered by the at least one filtering element.

* * * * *